(12) United States Patent
Schäfer

(10) Patent No.: US 8,157,488 B2
(45) Date of Patent: Apr. 17, 2012

(54) ROTATING SHAFT TOOL

(75) Inventor: Roland Schäfer, Stuttgart (DE)

(73) Assignee: Guehring OHG, Albstadt (DE)

( * ) Notice: Subject to any disclaimer, the term of this patent is extended or adjusted under 35 U.S.C. 154(b) by 0 days.

(21) Appl. No.: 12/775,936

(22) Filed: May 7, 2010

(65) Prior Publication Data

US 2010/0254777 A1    Oct. 7, 2010

Related U.S. Application Data

(63) Continuation of application No. PCT/DE2008/001648, filed on Oct. 14, 2008.

(51) Int. Cl.
B23B 51/06 (2006.01)
B23D 77/10 (2006.01)

(52) U.S. Cl. ........... 408/59; 408/171; 408/190; 408/225

(58) Field of Classification Search ............. 408/56–58, 408/171, 181–183, 189, 190, 223–225; 409/136, 409/230; B23B 51/06; B23D 77/00, 77/10
See application file for complete search history.

(56) References Cited

U.S. PATENT DOCUMENTS

| | | | | |
|---|---|---|---|---|
| 1,074,820 A | * | 10/1913 | Schellenbach | 408/160 |
| 1,117,946 A | * | 11/1914 | Fox | 408/171 |
| 1,127,121 A | * | 2/1915 | Wahlstrom | 408/155 |
| 1,240,553 A | * | 9/1917 | Foltz | 408/171 |
| 1,512,339 A | * | 10/1924 | Amedee et al. | 408/155 |
| 1,697,509 A | * | 1/1929 | Marty, Jr. | 408/156 |
| 1,774,701 A | * | 9/1930 | Davenport | 408/166 |
| 2,381,899 A | * | 8/1945 | Gracey | 408/57 |
| 2,556,372 A | * | 6/1951 | Johnston et al. | 408/171 |
| 2,623,422 A | * | 12/1952 | Billingsley, Jr. | 408/171 |
| 3,364,800 A | * | 1/1968 | Benjamin et al. | 408/239 R |
| 4,705,435 A | * | 11/1987 | Christoffel | 408/59 |
| 6,394,711 B1 | * | 5/2002 | Brosius | 408/57 |
| 6,575,672 B1 | | 6/2003 | Maier | |
| 7,156,589 B2 | * | 1/2007 | Sugata et al. | 409/136 |
| 7,713,004 B2 | * | 5/2010 | Lehto et al. | 407/33 |
| 2004/0022594 A1 | | 2/2004 | Hecht | |
| 2008/0089755 A1 | | 4/2008 | Kress | |
| 2009/0123244 A1 | | 5/2009 | Buettiker et al. | |

FOREIGN PATENT DOCUMENTS

| | | | |
|---|---|---|---|
| CH | 666643 A5 | * | 8/1988 |
| DE | 19 719 892 | | 11/1998 |
| DE | 10 2005 028 368 | | 12/2006 |
| DE | 20 2006 004 719 U1 | | 8/2007 |
| JP | 2003136322 A | * | 5/2003 |
| WO | WO 03068439 A1 | * | 8/2003 |
| WO | 03/101650 | | 12/2003 |
| WO | 2007/003248 | | 1/2007 |

* cited by examiner

*Primary Examiner* — Eric A Gates
(74) *Attorney, Agent, or Firm* — Burr & Brown

(57) ABSTRACT

Shaft tool with an adjustable cutting diameter, which permits improved handling. A rotating shaft tool, in particular a multi-stage reamer, with a first shaft part, equipped with a first cutting head comprising e.g. several cutting blades and a recess in the first shaft part, in which a second shaft part is positioned in the axis of the first shaft part, the second shaft part having a second cutting head with e.g. several blades and the diameter of the first cutting head being adjustable. The second shaft can be rotated in the first shaft part and the rotation in relation to one another creates a fixed connection between the shaft parts. This permits the connection between the two shaft parts and thus in particular the diameter of the first cutting head to be modified even though the shaft tool is inserted into e.g. a spindle of a machine tool.

10 Claims, 2 Drawing Sheets

ROTATING SHAFT TOOL

The invention relates to a rotating shaft tool. In some embodiments, the rotating shaft tool is a stepped reamer.

PRIOR ART

A stepped reamer is known from German Utility Model DE 20 2006 004 719 U1, which comprises a first shaft part, on which a first cutting head having cutters is implemented, a second shaft part having a smaller diameter, on which a second cutting head is implemented, being seated in a recess in the first shaft part. A conical seat is shaped between the first and the second shaft parts. Furthermore, adjustment means are provided, with which the clamping force of the conical seat is changeable, whereby the joining state of the conical seat can be adjusted. The diameter of the cutting head may thus be adjusted from the first shaft part.

A tie rod runs from the shaft part as the adjustment means.

OBJECT AND ADVANTAGES OF THE INVENTION

The invention is based on the object of providing a shaft tool having an adjustable cutter diameter, which allows improved handling.

The present invention provides a rotating shaft tool, in particular a stepped reamer, having a first shaft part, on which a first cutting head having, for example, multiple cutters is implemented and a recess is provided in the first shaft part, and in which a second shaft part is positioned in the axis of the first shaft part, on which a second cutting head having multiple cutters is provided. The diameter of the first cuttin ustable. One aspect of the invention is that the g head is adj second shaft part is seated so it is pivotable in the first shaft part, a connection having a fixed seat between the shaft parts being provided by pivoting the shaft parts to one another.

Through this measure, it is possible to change a connection of the two shaft parts and thus in particular the diameter of the first cutting head, although the shaft part is inserted into a spindle of a machine tool, for example. This is because pivoting the second shaft part does not necessarily require actuation areas, which would not be accessible in a state where the shaft tool is inserted into a spindle.

A conical seat is preferably formed between the first and the second shaft parts. Depending on the contact pressure force of the conical seat, geometrical conditions may be adjusted. If the cutters of the first shaft part are positioned in the seat area, for example, the diameter of the first cutting head can be changed in this way.

In a particularly preferred embodiment of the invention, the second shaft part is screwed into the first shaft part. Thus, for example, a diameter change of the first cutting head can be achieved via the conical seat depending on the screwing-in force.

Furthermore, it is preferable for pivoting the shaft parts to one another if engagement means for an actuating tool are provided on the second shaft part. For example, plane-parallel surfaces can be implemented for the use of an open-ended wrench.

Furthermore, it is preferable if engagement means are also provided on the first shaft part, for example, also in the form of plane-parallel surfaces for an open-ended wrench. A pivot force on the second shaft part may thus be resisted via the application of an actuating tool on the first shaft part, and vice versa.

Pivoting of the shaft parts to one another may thus be performed in an externally force-neutral manner. Corresponding engagement means for an actuating tool are preferably also accessible in the case of a state of the shaft tool mounted in a spindle, so that in the mounted state, pivoting of the shaft parts to one another is provided with the possibility of adjusting the diameter of the first cutting head.

A further aspect of the invention is that a cooling channel can be provided in the second shaft part, which has an outlet in the area of the second cutting head. A cooling channel is preferably also implemented in the first shaft part, which is connected to the cooling channel in the second shaft part.

The second cutting head can thus be centrally supplied with coolant/lubricant.

In a further preferred embodiment of the invention, the cooling channel in the second shaft part has a cooling channel section running along the shaft and a cooling channel section running outward from the axis of the second shaft part, which has an outlet in the area of a cutter of the second cutting head. In a case in which multiple cutters are situated on the cutting head, an outwardly running cooling channel section is preferably guided in the area of each cutter. The best possible lubrication/cooling of the cutters may thus be achieved in working use. For example, outwardly running cooling channel sections are implemented as cooling channel sections situated diagonally to the axis, which have an outlet in the area of a cutter.

In a further preferred embodiment of the invention, a screw element is provided in the second shaft part in the front side of the cutting head, in which a cooling channel section is implemented, which is connected to a cooling channel section which particularly runs centrally in the second shaft part. Through the use of a screw element, the guiding of the cooling channel in the second shaft part may be simplified with respect to production capability.

The screw element terminates a cooling channel section, which is situated centrally in the second shaft part, on the front side, but preferably simultaneously provides a connection of the terminated cooling channel section to one or more cooling channel sections running outward from the axis, which particularly each have an outlet in the area of the cutters of the second cutting head. For this purpose, the cooling channel section has connection sections in the screw element, for example, which have an outlet in an exposed area in a wall section of the second shaft part, from which the cooling channel sections running outward from the axis originate in the second shaft part. This observation presumes the mounted state of the screw element in the second shaft part.

The exposed area, such as a groove in the wall of the second shaft part, is preferably dimensioned in such a way that in advisable mounting locations of the screw element, which can assume various locations for the adjustment of various diameters of the second cutting head via a cone seat, for example, a connection of a cooling channel section running centrally in the second shaft part, for example, to the outwardly running cooling channel sections is always ensured.

DRAWINGS

An exemplary embodiment of the invention is explained in greater detail hereafter on the basis of multiple drawings with specification of further advantages and details.

Figure 2:
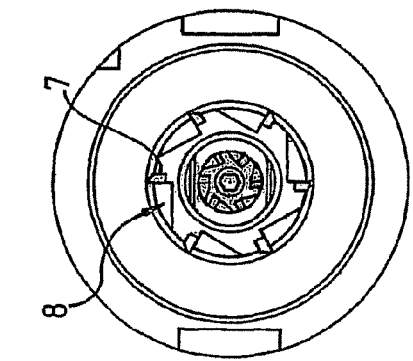
FIG. 2 shows the stepped reamer from FIG. 1 in a top view.
Figure 1:
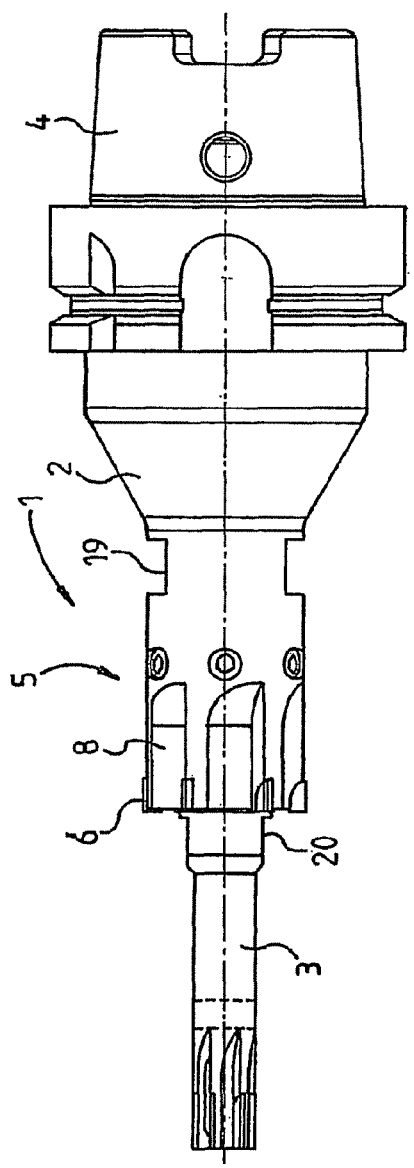
FIG. 1 shows a multistep reamer according to the invention in a side view.

A stepped reamer 1 is shown in the figures, which comprises a first shaft part 2 and a second shaft part 3. A hollow shaft cone 4 for the attachment to a machine tool is implemented on the first shaft part 2.

A cutting head 5 is provided on the first shaft part 2, which has, for example, PCD cutting plates 6 (polycrystalline diamond), which are situated in corresponding recesses 7. Chucking grooves 8 are associated with the PCD cutting plates 6. A total of six cutting plates 6 are distributed around the circumference of the cutting head 5.

The first shaft part 2 has a central passage 9, which forms a cone seat 10 having an inner cone 13 and a corresponding outer cone 11 on the second shaft part 3 in the area of the cutting head 5.

The inner cone 13 merges at the first shaft part 2 of the cone seat 10 into two cylindrical sections 14 and 15 through a groove 12, an internal thread 16 being implemented on the cylindrical section 15. A cylindrical section 17 having external thread 18 of the second shaft part 3 is screwed into the internal thread 16. The outer cone 11 is drawn into the inner cone 13 by tightening the screw connection made of internal thread 16 and external thread 18, so that a fixed seat of the second shaft part 3 in the first shaft part 2 is implemented.

Depending on the clamping state of the cone seat 10, an adjustment capability of a cutting diameter, on which the cutting plates 6 run, is given in a specific adjustment range, by pivoting the second shaft part 3 in relation to the first shaft part 2.

In order to be able to pivot the second shaft part 3 in relation to the first shaft part 2, a two-faced area 19 or 20 is provided on both the first shaft part 2 and also on the second shaft part 3, respectively, in which open-ended wrenches may be applied. The first two-faced area 19 has a wrench size of 21, for example. The second two-faced area 20 on the second shaft part 3 has a wrench size of 13, for example. It is thus possible to adjust the tension of the screw connection of the first shaft part to the second shaft part in an externally force-neutral manner by corresponding resistance using open-ended wrenches. This can also be performed if the stepped reamer 1 is already seated using its hollow shaft cone 4 in a spindle, possibly during an interruption of running processing, in order to readjust the diameter of the cutting head 5.

Figure 4:
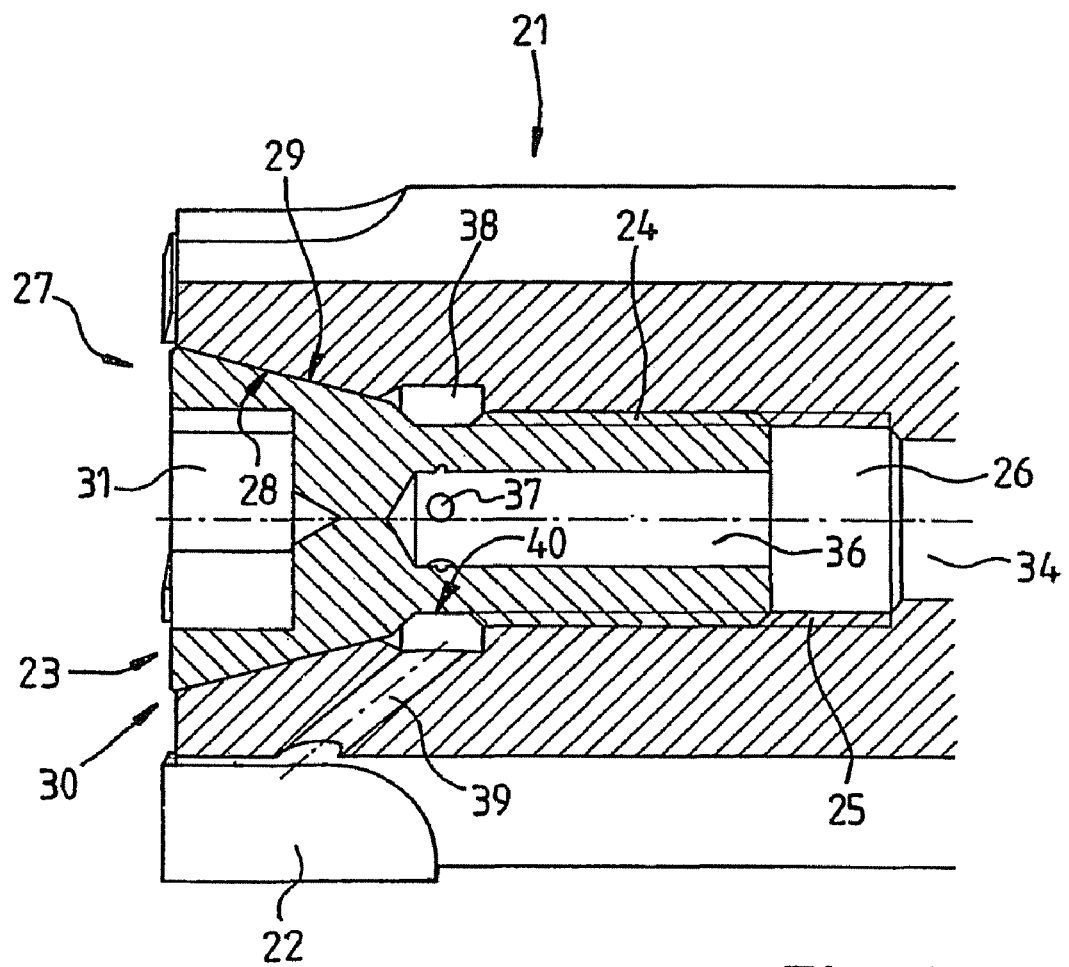
FIG. 4 shows an enlarged view of the front section of the multistep reamer according to the sectional view from FIG. 3.

In the exemplary embodiment, the diameter of a cutting head 21 having cutting plates 22 (see FIG. 4 in particular) on the second shaft part 3 is also adjustable. For this purpose, an adjustment screw 23 having an external thread 24 is screwed into an internal thread 25, which matches therewith, of a hole 26 from a front side 27 of the cutting head 21.

The adjustment screw 23 has an outer cone 28, which forms a cone seat 30 with an inner cone 29, which matches therewith, on the second shaft part 3. The inner cone 29 can be widened more or less by the clamping state of the cone seat 30, whereby a processing diameter, on which the cutting plates 22 run, may also be adjusted. Both the cone seat 10 and also the cone seat 30 are preferably adapted to one another so that initially the sections of the particular inner cone 13, 29 positioned frontally on the particular cutting head 5, 21 come into contact first, so that diameter widening is achievable there in a defined manner by screwing in the particular outer cone 11, 28.

The adjustment screw 23 can be screwed in via a hexagon socket 31, for example.

A further essential aspect of the stepped reamer 1 is in the coolant/lubricant guiding.

Figure 3:
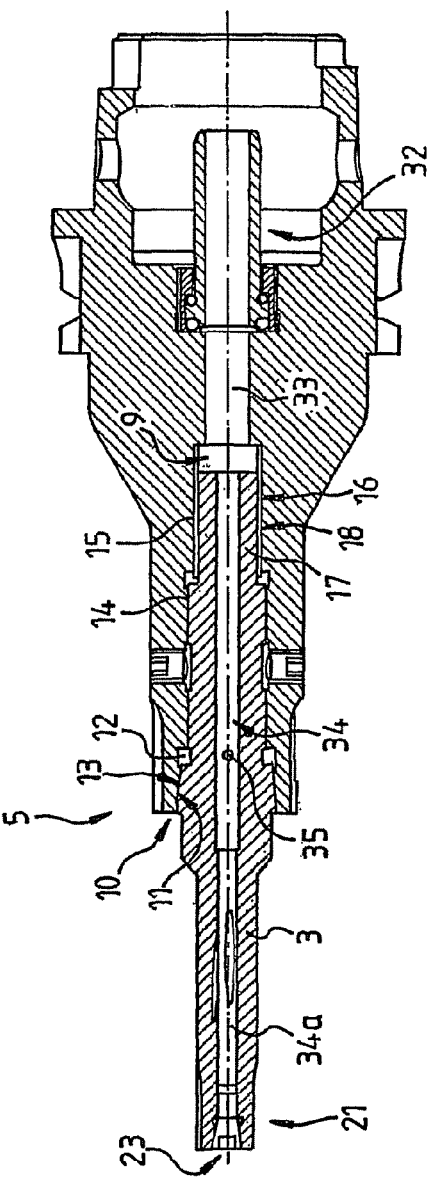
FIG. 3 shows the stepped reamer from FIG. 1 in a sectional side view of on the axis of the tool.

Coolant/lubricant reaches a first section 33 of the passage 9 from a spindle in the inserted state, for example, via a transfer set 32, which is known from the prior art. A transfer into a cooling channel 34 of the second shaft part 3 occurs in the cylindrical section 15. A lateral connection 35 to the groove 12 can be provided at the level of the groove 12 in the first shaft part 2, as is obvious in FIG. 3, from which connections (not shown) are implemented to outlets in the area of the particular cutting plates 6. Targeted cooling/lubrication of the cutting plates 6 can thus be performed during processing.

A section 34a of the cooling channel 34 completely penetrates the second shaft part 3. However, the passage 34 is closed by the adjustment screw 23 on the front side 27 of the second shaft part 3.

The adjustment screw 23 in turn has a central hole 36, having lateral connections 37 to an exposed area 38 on the second shaft part 3, from which diagonal stub lines 39 preferably branch off to each cutting plate 22. In order to provide sufficient space for the distribution in the stub channels 39 to the coolant/lubricant, for example, the adjustment screw 23 is tapered at this point by a constriction 40. Through this measure, coolant/lubricant can be guided during processing to each cutting plate 22 in a precisely targeted manner.

The invention claimed is:

1. A rotating shaft tool, comprising: a first shaft part, on which a first cutting head having at least one cutter is implemented, a second shaft part seated in an axis of the first shaft part in a recess in the first shaft part, a second cutting head having at least one cutter provided on the second shaft part, the diameter of the first cutting head being adjustable, the second shaft part being seated so it is rotatable in the first shaft part, a fixed connection between an internal thread on the first shaft part and an external thread on the second shaft part being able to be formed by pivoting the first shaft part and the second shaft part relative to one another.

2. The shaft tool according to claim 1, wherein the second shaft part can be screwed into the first shaft part.

3. The shaft tool according to claim 1, further comprising engagement means for an actuating tool provided on the second shaft part.

4. The shaft tool according to claim 1, further comprising engagement means for an actuating tool provided on the first shaft part.

5. The shaft tool according to claim 1, further comprising a cooling channel provided in the second shaft part, the cooling channel having an outlet in the area of the second cutting head.

6. The shaft tool according to claim 1, further comprising a cooling channel in the second shaft part, the cooling channel having a first cooling channel section running along the second shaft part and a second cooling channel section running outward from an axis of the second shaft part, the second cooling channel section having an outlet in the area of a cutter of the second cutting head.

7. The shaft tool according to claim 1, further comprising a screw element provided in the second shaft part in a front side of the second cutting head, in which a screw element cooling channel section is provided, which is connected to a first cooling channel section which runs in the second shaft part.

8. The shaft tool according to claim 1, further comprising a screw element provided in the second shaft part and a cooling channel section in the screw element which connects a cooling channel section situated in the second shaft part to a cooling channel section running outward from the axis.

9. The shaft tool according to claim 1, wherein an exposed area is provided in a wall section of the second shaft part, from which a cooling channel section running outward from the axis originates.

10. The shaft tool according to claim 1, further comprising a screw element, a cooling channel section in the screw element comprising a connection to an exposed area in a mounted state inserted in the second shaft part.

* * * * *

UNITED STATES PATENT AND TRADEMARK OFFICE
CERTIFICATE OF CORRECTION

PATENT NO. : 8,157,488 B2
APPLICATION NO. : 12/775936
DATED : April 17, 2012
INVENTOR(S) : Roland Schäfer It is certified that error appears in the above-identified patent and that said Letters Patent is hereby corrected as shown below:

Title Page: *please add* item (30), "Foreign Priority Data: 20 2007 015 595.6 (DE) filed November 7, 2007"

Signed and Sealed this
Third Day of September, 2013

Teresa Stanek Rea
*Acting Director of the United States Patent and Trademark Office*